(12) United States Patent
Yan

(10) Patent No.: US 7,787,189 B2
(45) Date of Patent: Aug. 31, 2010

(54) OBJECTIVE LENS SYSTEM

(75) Inventor: Zhen-tao Yan, Tantz Shiang (TW)

(73) Assignee: Asia Optical Co., Inc, Taichung (TW)

( * ) Notice: Subject to any disclaimer, the term of this patent is extended or adjusted under 35 U.S.C. 154(b) by 617 days.

(21) Appl. No.: 11/689,223

(22) Filed: Mar. 21, 2007

(65) Prior Publication Data

US 2008/0055737 A1  Mar. 6, 2008

(30) Foreign Application Priority Data

Aug. 31, 2006 (TW) .............................. 95132257 A

(51) Int. Cl.
  *G02B 21/02* (2006.01)
  *G02B 15/14* (2006.01)

(52) U.S. Cl. ................... 359/660; 359/679; 359/686

(58) Field of Classification Search ......... 359/656–661, 359/680–684, 649–650, 686–688, 676, 777–772, 359/432; *G02B 21/02*
See application file for complete search history.

(56) References Cited

U.S. PATENT DOCUMENTS

| 7,199,938 B2 * | 4/2007 | Fujimoto et al. ............ 359/656 |
| 2006/0087745 A1 * | 4/2006 | Fahlbusch et al. ........... 359/656 |

* cited by examiner

*Primary Examiner*—Darryl J Collins
*Assistant Examiner*—Zachary Wilkes

(57) ABSTRACT

An objective lens system includes a first lens group having a focal length F1 for focusing, a second lens group, which is a system of magnification variation having a focal length F2, a third lens group for compensation and having a focal length F3 and a fourth lens group having a focal length F4. The first lens group has a positive first lens assembly with a focal length F1$a$ and a negative second lens assembly with a focal length F1$b$. The third lens group ensures an image point of the second lens group falls within the focal length F3 thereof. The first, second, third and fourth lens groups commonly form a finite conjugative system of magnification variation. Moreover, the objective lens system, as a whole, has a negative focal length.

11 Claims, 4 Drawing Sheets

OBJECTIVE LENS SYSTEM

FIELD OF THE INVENTION

The present invention generally relates to an objective lens system, and in particular to an objective lens system applied in a microscope which has an increased NAO (Numerical Aperture of the Object Space thereof) with the same magnification thereby effectively enhancing the image resolution thereof.

BACKGROUND OF THE INVENTION

To a designer, it is the most practical method in designing an elementary structure of an optical lens that the optical trace of an incident ray in an optic system is obtained by some simple formulae. Such a method calculates and then tracks the optical trace of an incident ray in the optical system by using corresponding refraction and transfer formulae under a paraxial condition thereof.

Paraxial optics deals with the light transmission problem of a centered optical system symmetrical with regard to the axes thereof. Normally, a paraxial optics system includes rotary reflection planes or refraction planes with a common axis, which is called the optical axis. Such a centered optical system has one character that if a ray passes through this system very close to the optical axis, it will intersect with corresponding normal lines of any mirror surfaces within the system thereby resulting in a small angle of incidence. Such a ray is thus called a paraxial ray.

FIG. 1 of the attached drawings gives a simple paraxial optical system. A ray R1 parallel to the optical axis of the paraxial optical system enters a lens L from the left side thereof and intersects with the optical axis at a point F', which is referred to as a focal point of the lens L (also referred to as a second focal point). Another ray R2 passes through the lens L from a point at the left side thereof and comes out in a way parallel to the optical axis at the same height that the ray R1 enters into the system, which defines a first focal point F1 of the system. The two rays R1 and R2 intersect within the object space at a point O and define a point O' in the image space. That is, the point O' is an image of the point O. As the rays enter the lens L at an arbitrary height, the plane containing the point O and vertical to the optical axis forms an image of a corresponding plane containing the point O' and vertical to the optical axis as well. The two planes intersect with the optical axis respectively at the so-called principal points P and P'. The first principal point P is located in the object space while the second principal point P' is located in the image space. The point P' is thus the image of the point P. Moreover, as the distance from the point O to the optical axis equals to that from the point O' to the optical axis, the lateral magnifying rates of the images are also the same. Hence, the two planes OP and O'P' are the principal planes of the optical system and have a conjugative relationship therebetween. The distance from the first focal point to the first principal point is named the first focal length, while the distance from the second principal point to the second focal point is referred to as the second focal length or effective focal length (EFL).

U.S. Pat. No. 7,023,622 discloses an objective lens for microscopes. The objective lens comprises a first positive lens, a second positive lens, and a third The objective lens has a numerical aperture greater than or equal to 0.4, and a magnification ranging between 11 and 12 or between 4 and 11. The US patent aims to provide an objective lens that has a relatively small ratio of magnification-to-numerical aperture, for example, less than 30, and has a relative great ratio of the field of view (FOV)-to-diameter at the same time, for example, more than 0.1.

U.S. Pat. No. 6,560,033 also gives an objective lens including, from an object side to an image side thereof, a first meniscus positive lens, a second lens with a positive refractive power, a third lens group with a positive refractive power, a fourth lens group, and a fifth lens group. Such an objective lens system for microscopes has a magnification of 50 and a long working distance with the numerical aperture thereof reaching 0.55.

Still, another conventional objective lens provided by U.S. Pat. No. 6,501,603 adopts Gauss lens sets. This lens comprises a first positive lens group G1 and a second lens group G2. The second lens group G2 has a plurality of Gauss lens sets G2A to G2C. Each of the Gauss lens sets includes, from an object side to an image side thereof, a meniscus-shaped optical element with a concave surface facing the image side and a meniscus-shaped optical element with a concave surface facing the object side. This objective lens aims to take advantage of Gauss lens sets to correct aberrations. However, because more than two Gauss lens sets are used, the overall length and volume of the objective lens are inevitably increased and so do the costs thereof.

FIG. 2 shows a paraxial schematic view of a conventional optical system with a positive focal length. Generally, values of the numerical aperture in the object space (NAO) and the magnification (M) of such a positive optical system are given as follows:

| NAO | M |
|---|---|
| 0.05 | 0.9 |
| 0.1 | 4 |
| 0.25 | 10 |
| 0.4 | 25 |
| 0.65 | 40 |
| 0.85 | 63 |
| 1.25 | 100 |

If the magnification has to be between 0.9 and 9, which implies that the scope of the NAO is around 0.05-0.15, then the image resolution of the system is $4.06\lambda$ to $12.2\lambda$ according to the well-known image resolution formula of microscopes: $\delta=0.61*\lambda/NAO$. Thus, the result for the image resolution of such a positive optical system is not good.

Furthermore, as to a positive optical system, if it has a high magnification, then the distance between an object and the objective lens is relatively short; and vice versa. Hence, when there is a long distance between an object and the objective lens, the aperture of the lens has to be increased in order to enhance the NAO thereof, thereby adversely affecting the quality of the lens itself. On the contrary, a negative optical system can has a relatively large NAO while having a low magnification. Therefore, it is necessary to design a new negative optical system that has an increased NAO value with the same magnification to thereby enhance the image resolution thereof.

SUMMARY OF THE INVENTION

The main objective of the present invention is to provide an objective lens system with a negative focal length having an increased NAO value while having the same magnification at the same time, thereby enhancing the image resolution thereof.

To accomplish the above objective, the present invention provides an objective lens system, comprising, in sequence from an object side to an image side thereof, a first lens group having a focal length F1, a second lens group, which is a system of magnification variation and having a focal length F2, a third lens group for compensation having a focal length F3 and a fourth lens group having a focal length F4.

The first lens group has a positive first lens assembly with a focal length F1a and a negative second lens assembly with a focal length F1b. The third lens group ensures an image point of the second lens group falls within the focal length F3 thereof. The first, second, third and fourth lens groups commonly form a finite conjugate system of magnification change, and the whole objective lens system has a negative focal length.

The focal length F1a of the first lens assembly of the first lens group and the focal length F1 of the first lens group satisfy the following requirement: $0.8F1 \leq F1a \leq 1.2F1$. The focal lengths F1, F2 of the first and second lens groups meet the requirement: $1.8F1 \leq F2 \leq 2.2F1$.

The focal length F3 of the third lens group satisfies the following formula: $6(D1+D2+D3) \leq F3 \leq 8(D1+D2+D3)$, wherein D1, D2 and D3 are respectively the distances between the first and second lens groups, between the second and third lens groups, between the third and fourth lens groups.

The objective lens system of the present invention further comprises an aperture stop ST located between the second and third lens groups.

From the object side to the image side, the first lens assembly of the first lens group comprises a double-plane lens, a concave-convex lens and a double-convex lens, the second lens assembly comprises a double-convex lens and a double-concave lens, and the first lens group totally contains ten surfaces r1 to r10. The last surface r10 of the first lens group is an aspherical surface for correcting possible aperture aberrations in case of high magnification thereby improving the axial spherical aberration.

Parameters of the last surface r10 of the first lens group are: conic coefficient K=0.003035479, curvature radius R=1.738237, and aspherical coefficients of the fourth, sixth, eighth and tenth orders being respectively 0.0021409099, −0.022174842, 0.010690177 and −0.0099233468.

The second lens groups comprises, from the object side to the image side, a double-convex lens and a double-concave lens, and contains four surfaces r11 to r14. The third lens group comprises, from the object side to the image side, a double-concave lens, a convex-concave lens and a double-convex lens, and totally contains six surfaces r15 to r20.

The fourth lens group comprises, from the object side to the image side, a double-convex lens, a concave-convex lens and two double-plane lens, and totally contains eight surfaces r21 to r28. The first surface of the fourth lens group is an aspherical surface for correcting relative aberrations within the field of view (FOV). Moreover, the last surface r28 of the fourth lens group is a plane surface.

Parameters of the first surface r21 of the fourth lens group are: conic coefficients K=−0.6602577, curvature radius R=2.504539, thickness being is 0.007282585, refractive index being 1.520200, the Abbe-number being 52.020000, and aspherical coefficients of the fourth, sixth, eighth and tenth orders being respectively 0.039342084, 0.01913038, −0.0085947166, and 0.018000121.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
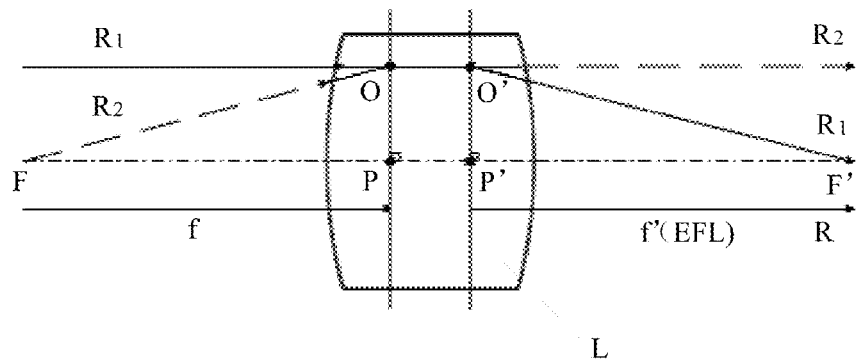
FIG. 1 is a paraxial schematic view of a prior optical system.

With reference to the drawings and in particular to FIGS. 4A-4E, an objective lens system constructed in accordance with the present invention comprises a first positive lens group G1, a second positive lens group G2, a third positive lens group G3, and a fourth positive lens group G4, which are arranged in sequence from an object side to an image side thereof.

The first lens group G1 has a focal length F1 and comprises a positive first lens assembly 1A with a focal length F1a and a negative second lens assembly 1B with a focal length F1b. The first lens group is for focusing purposes. The second lens group G2 is a system of magnification variation and has a focal length F2. The third lens group G3 has a focal length F3 and is for compensation purposes. The third lens group G3 ensures an image point of the second lens group G2 falling within the focal length F3 thereof. The fourth lens group G4 has a focal length F4.

The first, second, third and fourth lens groups G1, G2, G3, G4 commonly form a finite conjugative magnification system featuring magnification variation. Moreover, the whole objective lens in accordance with the present invention has a negative focal length.

The focal length F1a of the first lens assembly of the first lens group G1 and the focal length F1 of the first lens group G1 satisfy the following requirement: $0.8F1 \leq F1a \leq 1.2F1$ (in other words, F1a being set between 0.8F1 and 1.2F1). The focal lengths F1 and F2 of the first and second lens groups G1, G2 meet the requirement: $1.8F1 \leq F2 \leq 2.2F1$ (in other words, F2 being set between 1.8F1 and 2.2F1). The focal length F3 of the third lens group G3 meets the following formula: $6(D1+D2+D3) \leq F3 \leq 8(D1+D2+D3)$, and D1, D2 and D3 are the distances respectively between the first and second lens groups G1, G2, between the second and third lens groups G2, G3, and between the third and fourth lens groups G3, G4. This means F3 is set between six times of the sum of D1, D2, and D3, and eight times of the sum of the D1, D2, and D3.

The objective lens system of the present invention further comprises an aperture stop ST located between the second and third lens groups G2 and G3.

From the object side to the image side, the first lens assembly 1A of the first lens group G1 comprises a double-plane lens, a concave-convex lens and a double-convex lens, while the second lens assembly 1B has a double-convex lens and a double-concave lens. Therefore, the first lens group G1 totally contains ten (10) surfaces respectively designated at r1 to r10.

The last surface r10 of the first lens group G1 is an aspherical surface for correcting the pupil aberration thereof in case of high magnification and improving the spherical aberration on axis. Parameters of the surface r10 includes: conic coefficient K=0.003035479, curvature radius R=1.738237, and aspherical surface coefficients of the fourth, sixth, eighth and tenth orders are respectively 0.0021409099, −0.022174842, 0.010690177, and −0.0099233468.

From the object side to the image side, the second lens group G2 has a double-convex lens and a double-concave lens and contains totally 4 surfaces respectively designated r11 to r14. The third lens group G3 has a double-concave lens, a convex-concave lens and a double-convex lens and contains 6 surfaces respectively designated r15 to r20.

The fourth lens group G4 comprises, from the object side to the image side, a double-convex lens, a concave-convex lens and a double-plane lens, and contains totally 8 surfaces r21 to r28. The first surface r21 of the fourth lens group G4 is aspherical for correcting aberration related to the field of view (FOV) thereof. Parameters of the surface r21 include: conic coefficient K=−0.6602577, curvature radius R=2.504539, thickness being 0.007282585, refractive index being 1.520200, the Abbe-number being 52.020000, and the aspherical surface coefficients of the fourth, sixth, eighth and tenth orders thereof are respectively 0.039342084, 0.01913038, −0.0085947166, and 0.018000121. The last surface r28 of the fourth lens group G4 is a plane.

Figure 2:
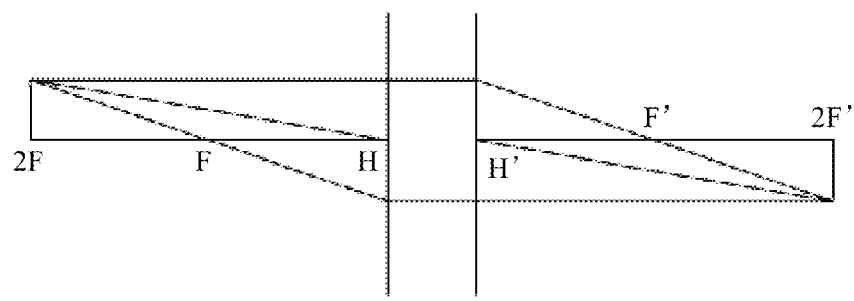
FIG. 2 is a paraxial schematic view of a prior positive optical system.
Figure 3:
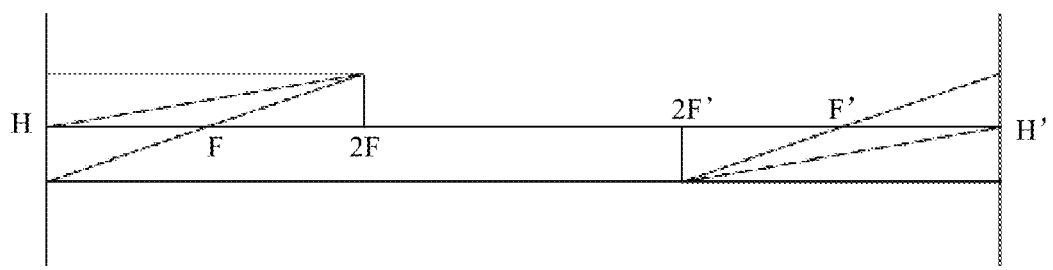
FIG. 3 is a paraxial schematic view of the objective lens system with a negative focal length thereof in accordance with the present invention.
Figure 4A:
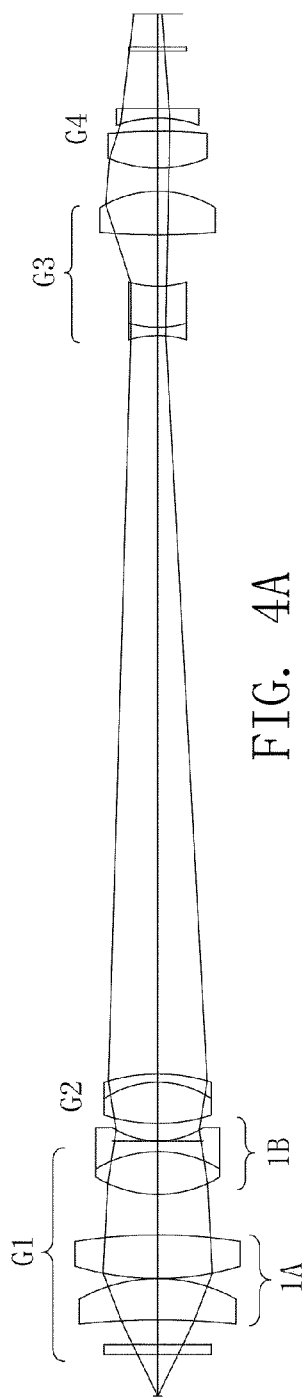
FIG. 4A is a structure schematic view of the objective lens system with a negative focal length thereof at a first position in accordance with the present invention.
Figure 4B:
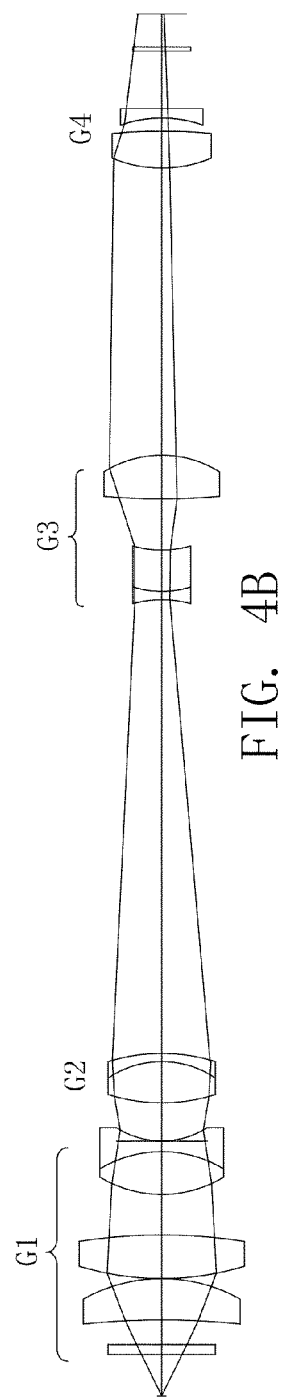
FIG. 4B is a structure schematic view of the objective lens system with a negative focal length thereof at a second position in accordance with the present invention.
Figure 4C:
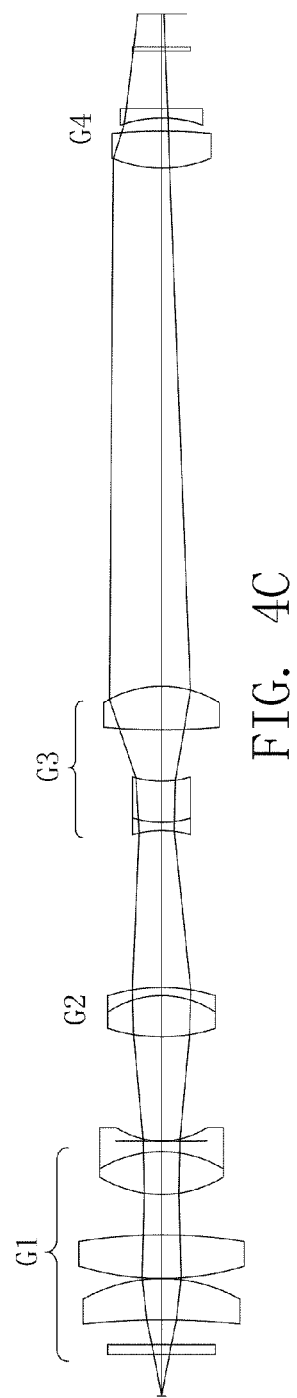
FIG. 4C is a structure schematic view of the objective lens system with a negative focal length thereof at a third position in accordance with the present invention.
Figure 4D:
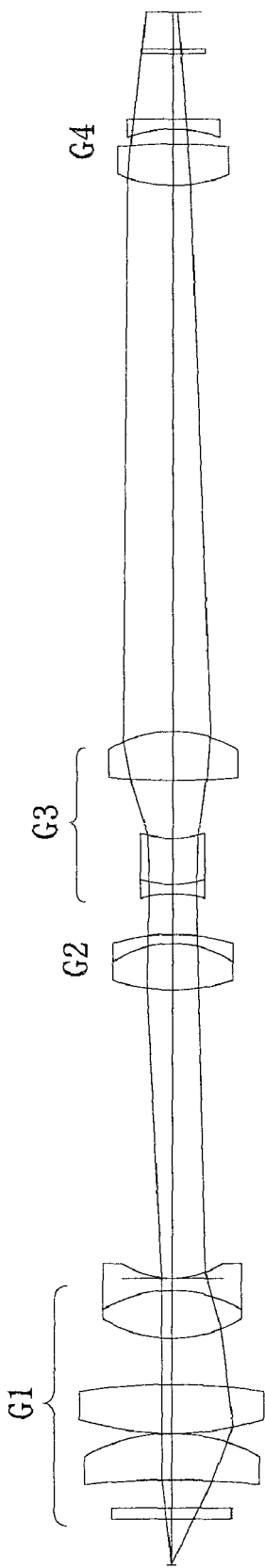
FIG. 4D is a structure schematic view of the objective lens system with a negative focal length thereof at a fourth position in accordance with the present invention.
Figure 4E:
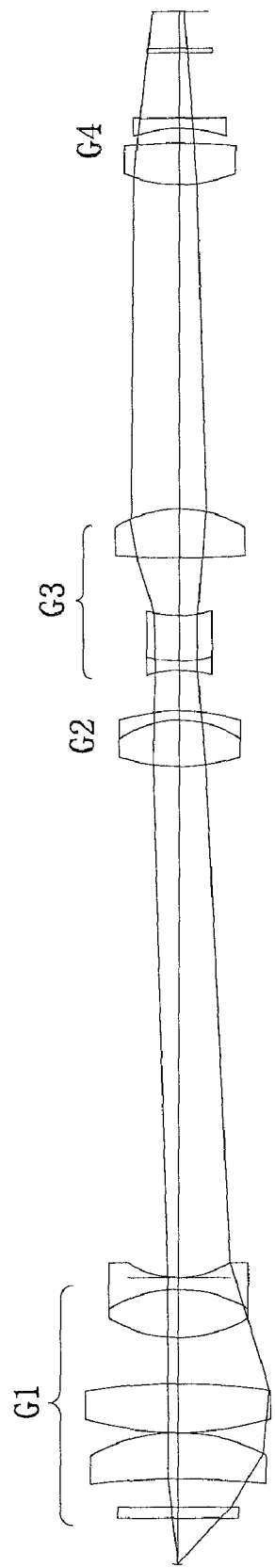
FIG. 4E is a structure schematic view of the objective lens system with a negative focal length thereof at a fifth position in accordance with the present invention.

FIG. 3 is a paraxial schematic view of the objective lens system of negative focal length in accordance with the present invention. By comparing with the conventional optic system shown in FIG. 2, it is obvious that a positive optical system with a high magnification has a short distance between an object and the lens thereof, and vice versa. Hence, if the numerical aperture of object space (NAO) needs to be increased for a long distance between an object and the lens, the aperture has to be increased and this adversely affects the quality of the lens. On the contrary, the objective lens system with a negative focal length in accordance with the present invention may have a relatively large NAO while having a low magnification at the same time.

The magnification of the objective lens system in accordance with the present invention is between 0.9 and 9 and the corresponding value of the NAO is between 0.07 and 0.42. However, the suitable NAO value of an optical system with a positive focal length has to be 0.05 to 0.15 if it needs to have the same magnification as that of the present invention.

According to the formula for the image resolution of microscope objective lens: $\delta=0.61*\lambda/NAO$, the resolution of the positive focal system is from $4.06\lambda$ to $12.2\lambda$, while that of the objective lens system of the present invention is between $1.45\lambda$ and $8.7\lambda$. Obviously, the resolution of the present invention is two to three times of that of the positive focal system with the same magnification.

Table 1 gives parameters or a surface data summary of the surfaces of the objective lens system of the present invention. In the table, OBJ, STO and IMA respectively represent the object to be imaged, the aperture stop and the image plane.

TABLE 1

| Surface | Type | Radius | Thickness | Refractive Index | Abbe-number | Conic coefficient |
|---|---|---|---|---|---|---|
| OBJ | standard | infinite | 0.678401 | | | 0 |
| 1 | standard | infinite | 0.174782 | 1.516800 | 64.167336 | 0 |
| 2 | standard | infinite | 0.4223899 | | | 0 |
| 3 | standard | −10.58713 | 0.7282585 | 1.846660 | 23.777940 | 0 |
| 4 | standard | −2.607165 | 0.02913034 | | | 0 |
| 5 | standard | 4.313621 | 0.7282585 | 1.846660 | 23.777940 | 0 |
| 6 | standard | −9.404439 | 0.7004091 | | | 0 |
| 7 | standard | 2.200215 | 0.7151499 | 1.603001 | 65.443648 | 0 |
| 8 | standard | −2.259058 | 0.1456517 | 1.805181 | 25.425363 | 0 |
| 9 | standard | 1.768503 | 0.007282585 | 1.520200 | 52.020000 | 0 |
| 10 | EVENASPH | 1.738237 | 0 | | | 0.003035479 |
| 11 | standard | 2.913034 | 0 | | | 0 |
| 12 | standard | infinite | 7.81441 | | | 0 |
| 13 | standard | 4.157919 | 0.6364979 | 1.618000 | 63.333504 | 0 |
| 14 | standard | −1.290037 | 0.1456517 | 1.850255 | 32.169919 | 0 |
| 15 | standard | −2.403836 | 0.6978181 | | | 0 |
| 16 | standard | −2.456125 | 0.1456517 | 1.539956 | 59.462478 | 0 |

TABLE 1-continued

| Surface | Type | Radius | Thickness | Refractive Index | Abbe-number | Conic coefficient |
|---|---|---|---|---|---|---|
| 17 | standard | 1.827051 | 0.7282585 | 1.846659 | 23.780116 | 0 |
| 18 | standard | 1.343346 | 0.9133284 | | | 0 |
| 19 | standard | 8.609618 | 0.7282585 | 1.496999 | 81.545888 | 0 |
| 20 | standard | −1.592264 | 4.565746 | | | 0 |
| 21 | EVENASPH | 2.504539 | 0.007282585 | 1.520200 | 52.020000 | −0.6602577 |
| 22 | standard | 2.239541 | 0.6088241 | 1.846659 | 23.780116 | 0 |
| 23 | standard | −12.46779 | 0.2347777 | | | 0 |
| 24 | standard | −1.964259 | 0.1456517 | 1.728250 | 28.460599 | 0 |
| 25 | standard | infinite | 1.019562 | | | 0 |
| 26 | standard | infinite | 0.05826068 | 1.516800 | 64.167336 | 0 |
| 27 | standard | infinite | 0.5243461 | | | 0 |
| 28 | standard | infinite | −0.002760054 | | | 0 |
| IMA | standard | infinite | | | | 0 |

It shall also be satisfied at the same time that:
Surface r10: EVENASPH
Aspherical Coefficient r4: 0.0021409099
Aspherical Coefficient r6: −0.022174842
Aspherical Coefficient r 8: 0.010690177
Aspherical Coefficient r 10: −0.0099233468
Surface r 21: EVENASPH
Aspherical Coefficient r 4: 0.039342084
Aspherical Coefficient r 6: 0.01913038
Aspherical Coefficient r 8: −0.0085947166
Aspherical Coefficient r 10: 0.018000121

Table 2 lists magnification, numerical aperture and corresponding thickness of the related lens of the objective lens in accordance with the present invention.

TABLE 2

| Magnification | 0.9 | 1.5 | 3 | 6 | 9 |
|---|---|---|---|---|---|
| Numerical Aperture | 0.07 | 0.09 | 0.17 | 0.31 | 0.42 |
| Thickness 12 | 7.81441 | 4.366646 | 1.88076 | 0.678849 | 0.291303 |
| Thickness 15 | 0.697818 | 0.509781 | 2.425636 | 7.548696 | 12.49537 |
| Thickness 20 | 4.565746 | 8.201547 | 8.771578 | 4.850429 | 0.291303 |

FIGS. 4A-4E are schematic views of the objective lens system with a magnification respectively valued at 9, 6, 3, 1.5 and 0.9. The views show the positions of the first, second, third and fourth lens groups located respectively at a first, second, third, fourth and fifth positions.

Figure 5A:
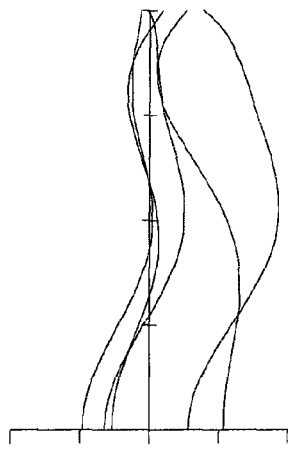
FIG. 5A is the longitudinal spherical aberration view of the objective lens system with a surface r10 thereof being an aspherical surface in accordance with the present invention.
Figure 5B:
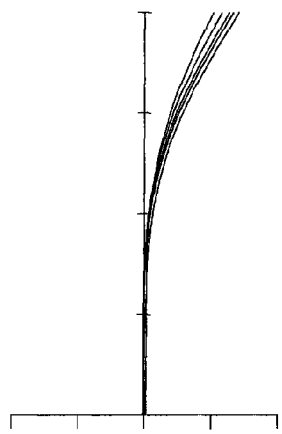
FIG. 5B is the longitudinal spherical aberration view of the objective lens system with a surface r10 thereof being a spherical surface in accordance with the present invention.
Figure 6A:
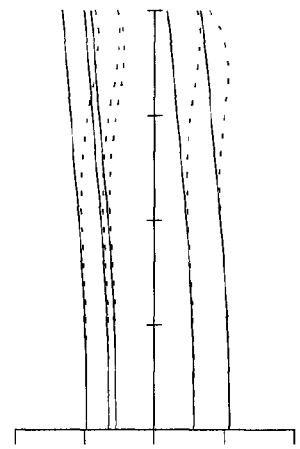
FIG. 6A is the astigmatic and field curves aberration view of the objective lens system with a magnification of 9 and a surface r21 thereof being an aspherical surface in accordance with the present invention.
Figure 7A:
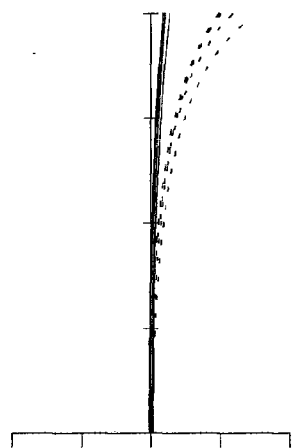
FIG. 7A is the astigmatic and field curves aberration view of the objective lens system with a magnification of 9 and a surface r21 thereof being a spherical surface in accordance with the present invention.

FIGS. 5A and 5B are longitudinal spherical aberration views of the objective lens system with the surface r10 thereof being an aspherical surface and a spherical surface, respectively. FIGS. 6A and 7A are astigmatic and field curves aberration views of the objective lens system with a magnification of 9 and the surface r21 thereof being an aspherical surface and a spherical surface respectively.

Figure 6B:
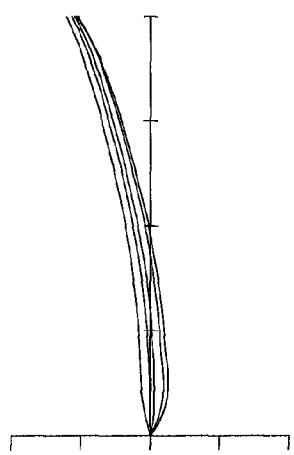
FIG. 6B is the distortion view of the objective lens system with a magnification of 9 and a surface r21 thereof being an aspherical surface in accordance with the present invention.
Figure 7B:
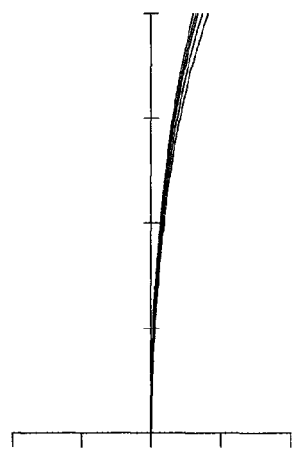
FIG. 7B is the distortion view of the objective lens system with a magnification of 9 and a surface r21 thereof being a spherical surface in accordance with the present invention.

FIGS. 6B and 7B are distortion views of the objective lens system with a magnification of 9 and the surface r21 thereof being an aspherical surface and a spherical surface, respectively.

In sum, the objective lens system of the present invention is a finite conjugative system of magnification change by the arrangement of the first, second, third and fourth lens groups G1, G2, G3 and G4. The objective lens system has a negative focal length thereby facilitating the increase of the image resolution thereof with the same magnification.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An objective lens system, comprising, in sequence from an object side to an image side:
    a first lens group having a focal length F1, having a positive first lens assembly with a focal length F1a and a negative second lens assembly with a focal length F1b, and the first lens assembly being used for focusing;
    a second lens group being a system of magnification variation with a focal length F2;
    a third lens group for compensation having a focal length F3, the third lens group providing an image point of the second lens group in a location within the focal length F3; and
    a fourth lens group having a focal length F4;
    wherein the first, second, third and fourth lens groups form a finite conjugative system of magnification variation, and the system as a whole has a negative focal length, wherein the focal length F1a of the first lens assembly and the focal length F1 of the first lens group satisfy the following requirement: $0.8F1 \leq F1a \leq 1.2F1$, and wherein the focal lengths F1, F2 of the first and second lens groups meet the requirement: $1.8F1 \leq F2 \leq 2.2F1$.

2. The objective lens system as claimed claim 1, wherein the focal length F3 of the third lens group satisfies the following formula: $6(D1+D2+D3) \leq F3 \leq 8(D1+D2+D3)$, wherein D1, D2 and D3 are respectively distances between the first and second lens groups, between the second and third lens groups, and between the third and fourth lens groups.

3. The objective lens system as claimed in claim 1, wherein, from the object side to the image side, the first lens assembly of the first lens group comprises a double-plane lens, a concave-convex lens and a double-convex lens, the second lens assembly comprises a double-convex lens and a double-concave lens, and the first lens group totally contains ten surfaces r1 to r10.

4. The objective lens system as claimed in claim 3, wherein the last surface r10 of the first lens group is an aspherical surface for correcting possible aperture aberration in case of high magnification thereby improving the axial spherical aberration.

5. The objective lens system as claimed in claim 4, wherein the last surface r10 of the first lens group has parameters including: conic coefficient K=0.003035479, curvature radius R=1.738237, and aspherical coefficients of the fourth, sixth, eighth and tenth orders thereof being respectively 0.0021409099, −0.022174842, 0.010690177 and −0.0099233468.

6. The objective lens system as claimed in claim 5, wherein, from the object side to the image side, the second lens groups comprises a double-convex lens and a double-concave lens, and contains four surfaces r11 to r14.

7. The objective lens system as claimed in claim 6, wherein, from the object side to the image side, the third lens group comprises a double-concave lens, a convex-concave lens and a double-convex lens, and totally contains six surfaces r15 to r20.

8. The objective lens system as claimed in claim 7, wherein, from the object side to the image side, the fourth lens group comprises a double-convex lens, a concave-convex lens and two double-plane lenses, and totally contains eight surfaces r21 to r28.

9. The objective lens system as claimed in claim 8, wherein the first surface of the fourth lens group is an aspherical surface for correcting possible aberration within the field of view.

10. The objective lens system as claimed in claim 9, wherein the first surface r21 of the fourth lens group has parameters including: conic coefficient K=−0.6602577, curvature radius R−2.504539, thickness being 0.007282585, refractive index being 1.520200, the Abbe-number being 52.020000, and the aspherical coefficients of the fourth, sixth, eighth and tenth orders being respectively 0.039342084, 0.01913038, −0.0085947166 and 0.018000121.

11. The objective lens system as claimed in claim 10, wherein the last surface r28 of the fourth lens group is a plane surface.

* * * * *